(12) United States Patent
Kitamura

(10) Patent No.: US 12,326,628 B2
(45) Date of Patent: Jun. 10, 2025

(54) DISPLAY DEVICE

(71) Applicant: Japan Display Inc., Tokyo (JP)

(72) Inventor: Koji Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/794,118

(22) Filed: Aug. 5, 2024

(65) Prior Publication Data
US 2025/0068009 A1 Feb. 27, 2025

(30) Foreign Application Priority Data

Aug. 24, 2023 (JP) ................................ 2023-136461

(51) Int. Cl.
| | | |
|---|---|---|
| *G02F 1/1334* | (2006.01) | |
| *G02F 1/1333* | (2006.01) | |
| *G02F 1/1337* | (2006.01) | |
| *G02F 1/1362* | (2006.01) | |
| *G02F 1/1368* | (2006.01) | |

(52) U.S. Cl.
CPC ...... *G02F 1/1334* (2013.01); *G02F 1/133345* (2013.01); *G02F 1/1337* (2013.01); *G02F 1/136286* (2013.01); *G02F 1/1368* (2013.01)

(58) Field of Classification Search
CPC ............. G02F 1/1334; G02F 1/133345; G02F 1/1337; G02F 1/136286; G02F 1/1368
See application file for complete search history.

(56) References Cited

U.S. PATENT DOCUMENTS

| | | | | |
|---|---|---|---|---|
| 2017/0010500 | A1* | 1/2017 | Han | ................ G02F 1/133345 |
| 2018/0040645 | A1* | 2/2018 | Ishii | .................... H10D 86/451 |
| 2018/0120619 | A1* | 5/2018 | Cho | ................ G02F 1/136286 |
| 2021/0286226 | A1* | 9/2021 | Sugiyama | ........ G02F 1/133616 |
| 2022/0004052 | A1* | 1/2022 | Ohue | .................... G02F 1/1334 |
| 2023/0350257 | A1 | 11/2023 | Muramoto et al. | |

FOREIGN PATENT DOCUMENTS

WO    2022153665  A1    7/2022

* cited by examiner

*Primary Examiner* — Kevin Quarterman
(74) *Attorney, Agent, or Firm* — Maier & Maier, PLLC

(57) ABSTRACT

According to one embodiment, a display device includes a first substrate, a second substrate, and a liquid crystal layer. The first substrate includes a first transparent substrate, a scanning line, a signal line, a switching element, an organic insulating film including an aperture and overlapping with the scanning line, the signal line, and the switching element, and a first alignment film overlapping with the organic insulating film. The second substrate includes a second transparent substrate, and a second alignment film overlapping with the second transparent substrate. At least a part of a portion of the first alignment film, which overlaps with the organic insulating film, is in contact with the second alignment film.

14 Claims, 14 Drawing Sheets

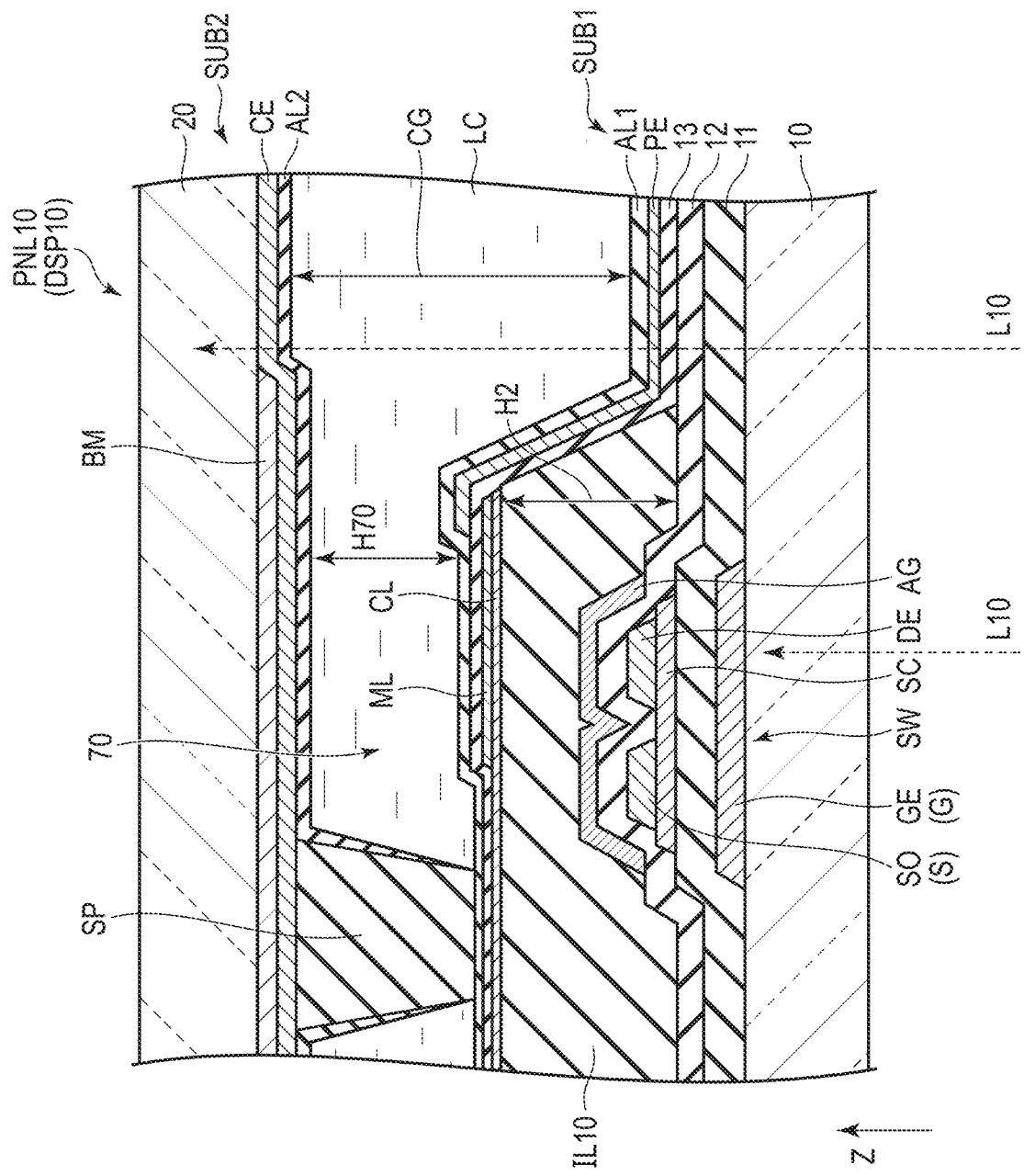
F I G. 11

DISPLAY DEVICE

CROSS-REFERENCE TO RELATED APPLICATIONS

This application is based upon and claims the benefit of priority from Japanese Patent Application No. 2023-136461, filed Aug. 24, 2023, the entire contents of which are incorporated herein by reference.

FIELD

Embodiments described herein relate generally to a display device.

BACKGROUND

In recent years, a display device comprising a display panel including a polymer dispersed liquid crystal layer (PDLC), light sources, and the like has been proposed. The polymer dispersed liquid crystal layer can switch a transparent state in which light is transmitted and a scattered state in which light is scattered, depending on the application of voltage.

BRIEF DESCRIPTION OF THE DRAWINGS

FIG. 11 is a schematic cross-sectional view showing an example of a display panel provided in the display device according to the comparative example.

DETAILED DESCRIPTION

In general, according to one embodiment, a display device includes a first substrate, a second substrate overlapping with the first substrate, a liquid crystal layer located between the first substrate and the second substrate and containing polymer dispersed liquid crystal, and a light emitting element. The first substrate includes a first transparent substrate, a scanning line, a signal line intersecting the scanning line, a switching element electrically connected to the scanning line and the signal line, an organic insulating film including an aperture and overlapping with the scanning line, the signal line, and the switching element, a pixel electrode overlapping with the aperture and electrically connected to the switching element, and a first alignment film overlapping with the organic insulating film and being in contact with the liquid crystal layer. The second substrate includes a second transparent substrate, and a second alignment film overlapping with the second transparent substrate and being in contact with the liquid crystal layer. At least a part of a portion of the first alignment film, which overlaps with the organic insulating film, is in contact with the second alignment film.

According to such a configuration, a display device capable of improving the display quality can be provided.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like of each portion as compared with actual embodiments, but they are mere examples and do not restrict the interpretation of the invention. Furthermore, in the description and figures of the present application, structural elements having the same or similar functions will be referred to by the same reference numbers and detailed explanations of them that are considered redundant may be omitted.

In the embodiments, a highly translucent liquid crystal display device to which polymer dispersed liquid crystal is applied (so-called transparent display device) is disclosed as an example of the display device. However, the configurations disclosed in the embodiments can also be applied to the other types of display devices.

First Embodiment

Figure 1:
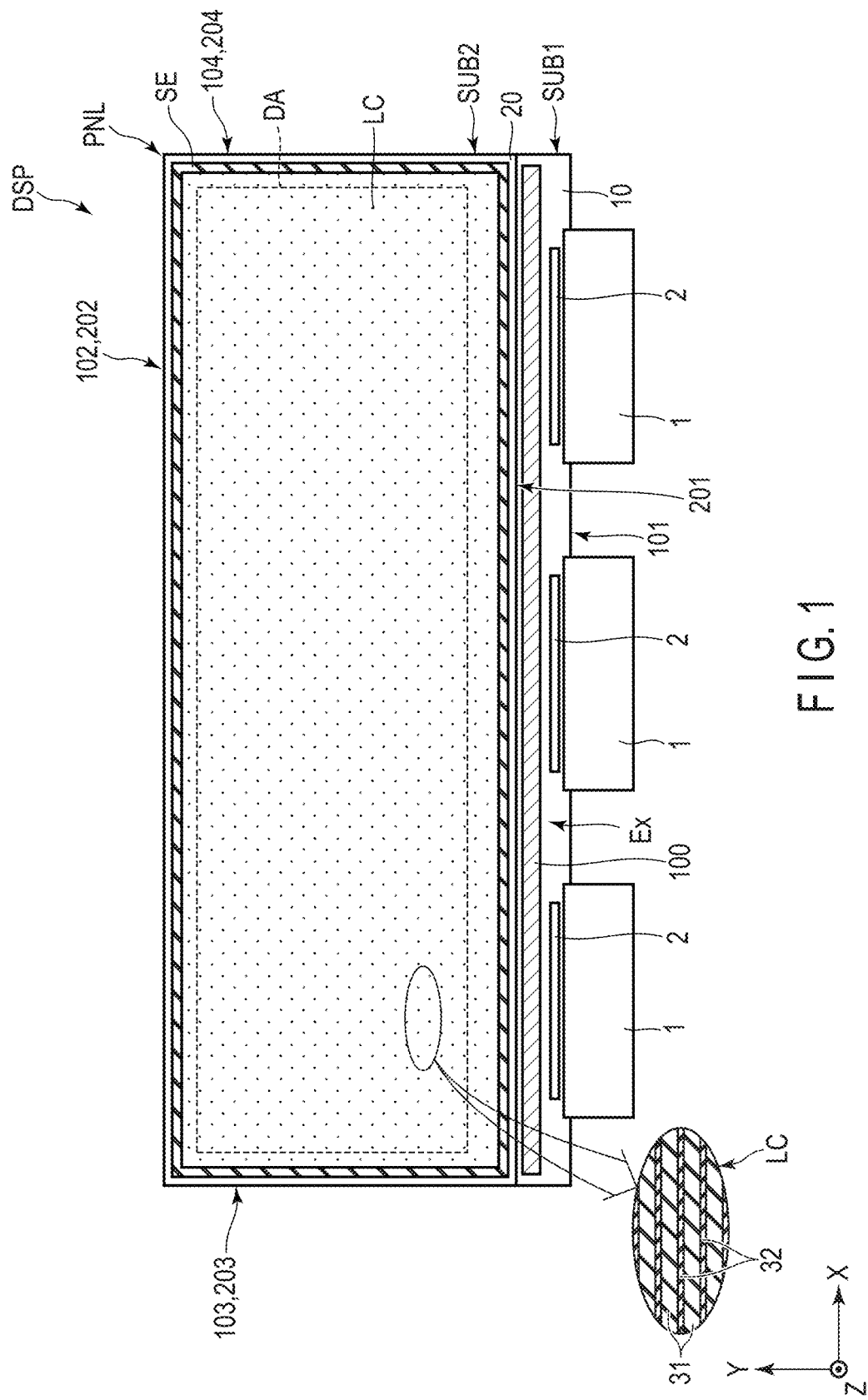
FIG. 1 is a schematic plan view showing an example of a display device according to a first embodiment.

FIG. 1 is a schematic plan view showing an example of a display device DSP according to the present embodiment. In the drawings including FIG. 1, an X-axis, a Y-axis and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z.

The first direction X, the second direction Y, and the third direction Z are orthogonal to each other, but may cross each other at an angle other than 90 degrees. The first direction X and the second direction Y correspond to the directions parallel to the main surface of the substrate which constitutes the display device DSP, and the third direction Z corresponds to the thickness direction of the display device DSP. In the embodiments, viewing an X-Y plane defined by the first direction X and the second direction Y is referred to as plan view.

The display device DSP comprises a display panel PNL, a plurality of wiring boards 1, a plurality of IC chips 2, and a light emitting module 100.

The display panel PNL has a rectangular shape elongated in the first direction X in the example shown in FIG. 1.

Incidentally, the display panel PNL may be formed in a rectangular shape elongated in the second direction Y, a square shape, the other polygonal shape, or the other shape such as a circular shape or an elliptical shape.

The display panel PNL comprises a first substrate SUB1, a second substrate SUB2 that overlaps with the first substrate SUB1, a liquid crystal layer LC that contains polymer dispersed liquid crystal, and a seal SE. The first substrate SUB1 and the second substrate SUB2 are formed in a flat plate shape parallel to the X-Y plane.

The first substrate SUB1 and the second substrate SUB2 overlap with each other in the third direction Z. An area where the first substrate SUB1 and the second substrate SUB2 overlap includes a display area DA where images are displayed.

The first substrate SUB1 comprises the first transparent substrate 10. The first transparent substrate 10 has side surfaces 101 and 102 along the first direction X and side surfaces 103 and 104 along the second direction Y. The side surfaces 101 and 102 are arranged in this order in the second direction Y. The side surfaces 103 and 104 are arranged in this order in the first direction X.

The second substrate SUB2 comprises the second transparent substrate 20. The second transparent substrate 20 has side surfaces 201 and 202 along the first direction X and side surfaces 203 and 204 along the second direction Y.

The side surfaces 101 and 102 and the side surfaces 201 and 202 are side surfaces along the long sides of the display panel PNL, and the side surfaces 103 and 104 and the side surfaces 203 and 204 are side surfaces along the short sides of the display panel PNL.

In the example shown in FIG. 1, the side surface 102 overlaps with the side surface 202, the side surface 103 overlaps with the side surface 203, and the side surface 104 overlaps with the side surface 204, but these side surfaces do not need to overlap.

A width of the first substrate SUB1 in the second direction Y is larger than a width of the second substrate SUB2 in the second direction Y. In other words, the side surface 201 does not overlap with the side surface 101. The side surface 201 is located between the side surface 101 and the display area DA in the second direction Y.

The first substrate SUB1 includes an extending portion Ex located between the side surface 101 and the side surface 201. The extending portion Ex corresponds to a portion of the first substrate SUB1, which extends in a direction opposite to the second direction Y from a portion overlapping with the second substrate SUB2.

The plurality of wiring boards 1 and the plurality of IC chips 2 are mounted on the extending portion Ex. The plurality of wiring boards 1 are, for example, flexible printed circuits which can be bent. The plurality of IC chips 2 incorporate, for example, display drivers which outputs signals necessary for image display, and the like. The IC chip 2 may be mounted on the wiring board 1.

The plurality of wiring boards 1 are aligned at intervals in the first direction X with respect to the display panel PNL in the example shown in FIG. 1. Incidentally, the plurality of wiring boards 1 may be a single wiring board extending in the first direction X.

The plurality of IC chips 2 are aligned at intervals in the first direction X with respect to the display panel PNL in the example shown in FIG. 1. Incidentally, the plurality of IC chips 2 may be a single IC chip extending in the first direction X.

Details of the light emitting module 100 will be described later. The light emitting module 100 is arranged along the side surface 201 of the second transparent substrate 20. The light emitting module 100 overlaps with the extending portion Ex in plan view.

The seal SE adheres the first substrate SUB1 and the second substrate SUB2. The seal SE is formed in a frame shape. The seal SE surrounds the liquid crystal layer LC between the first substrate SUB1 and the second substrate SUB2.

The liquid crystal layer LC is held between the first substrate SUB1 and the second substrate SUB2. Such a liquid crystal layer LC is arranged over an area (including the display area DA) surrounded by the seal SE in plan view.

As shown and enlarged in FIG. 1, the liquid crystal layer LC is composed of polymer dispersed liquid crystals containing polymers 31 and liquid crystal molecules 32. For example, the polymer 31 is liquid crystal polymer. The polymer 31 is formed in a stripe shape extending along the first direction X and is aligned in the second direction Y.

The liquid crystal molecules 32 are dispersed in gaps of the polymer 31 and aligned such that their major axis extends in the first direction X. The polymer 31 and the liquid crystal molecules 32 have optical anisotropy or refractive anisotropy. The response performance of the polymer 31 to the electric field is lower than the response performance of the liquid crystal molecules 32 to the electric field.

For example, the alignment direction of the polymers 31 is hardly varied irrespective of the presence or absence of the electric field. In contrast, the orientation of alignment of the liquid crystal molecules 32 is varied in accordance with the electric field in a state in which a voltage higher than or equal to the threshold value is applied to the liquid crystal layer LC.

In a state in which the voltage is not applied to the liquid crystal layer LC (initial alignment state), optical axes of the polymers 31 and the liquid crystal molecules 32 are parallel to one another, and the light made incident on the liquid crystal layer LC is hardly scattered but is transmitted through the liquid crystal layer LC (transparent state).

In a state in which a voltage is applied to the liquid crystal layer LC, the alignment direction of the liquid crystal molecules 32 changes, and the optical axes of the polymers 31 and the liquid crystal molecules 32 intersect one another. Therefore, the light made incident on the liquid crystal layer LC is scattered in the liquid crystal layer LC (scattered state). In other words, the liquid crystal layer LC can switch the transparent state and the scattered state in accordance with the applied voltage.

Figure 2:
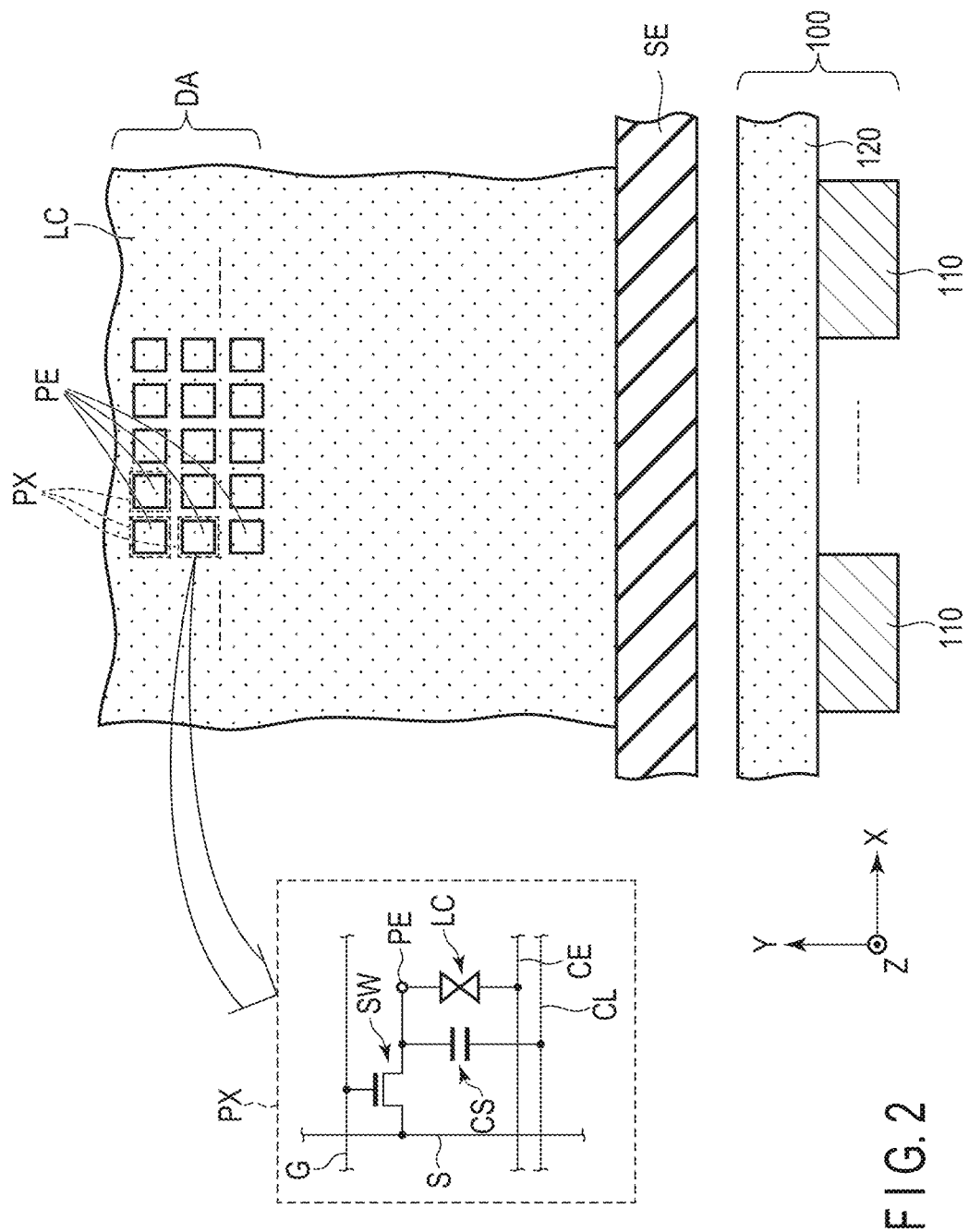
FIG. 2 is a schematic plan view showing an area in the vicinity of a light emitting module.

FIG. 2 is a schematic plan view showing an area in the vicinity of the light emitting module 100. The light emitting module 100 comprises a plurality of light emitting elements 110 and a light guide 120. The plurality of light emitting elements 110 are arranged in the first direction X. The light guide 120 is formed in a rod shape extending in the first direction X. The light guide 120 is located between the seal SE and the light emitting elements 110.

The display area DA includes a plurality of pixels PX arrayed in a matrix in the first direction X and the second direction Y. These pixels PX are represented by dotted lines in the drawing. Each of the pixels PX comprises a pixel electrode PE represented as a square of a solid line in the drawing.

As shown and enlarged in FIG. 2, each pixel PX comprises a switching element SW, a pixel electrode PE, a common electrode CE, and a capacitance CS. The switching element SW is formed of, for example, a thin-film transistor (TFT) and is electrically connected to a scanning line G and a signal line S.

The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW.

The common electrode CE and a power supply line CL are arranged over the display area DA and its surrounding area. A common voltage Vcom is applied to the common electrode CE. For example, a voltage having the same potential as the common electrode CE is applied to the power supply line CL.

Each of the pixel electrodes PE is opposed to the common electrode CE in the third direction Z. In the display area DA, the liquid crystal layer LC (particularly, liquid crystal molecules 32) is driven by an electric field produced between the pixel electrode PE and the common electrode CE. A capacitance CS is formed, for example, between the power supply line CL and the pixel electrode PE.

Figure 3:
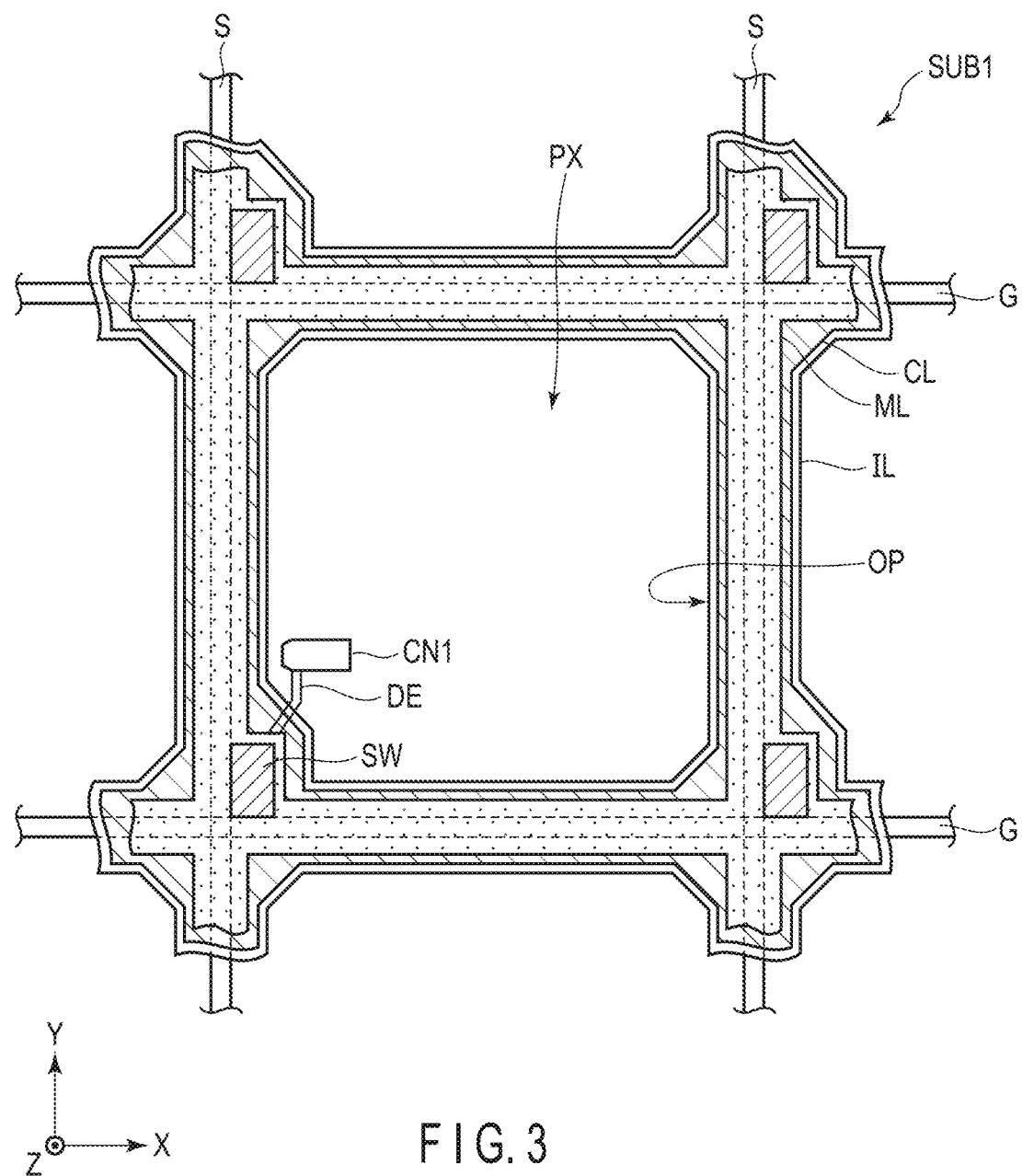
FIG. 3 is a schematic plan view showing an example of a pixel.

FIG. 3 is a schematic plan view showing an example of the pixel PX. FIG. 3 shows a part of the configuration included in the first substrate SUB1. The first substrate SUB1 comprises a plurality of scanning lines G, a plurality of signal lines S, switching elements SW, an insulating film IL, the power supply line CL, metal lines ML, and connection electrodes CN1.

Each of the plurality of scanning lines G extends in the first direction X. Each of the plurality of signal lines S extends in the second direction Y and intersects the plurality of scanning lines G. In the present specification, the pixel PX corresponds to an area defined by two scanning lines G that are adjacent in the second direction Y and two signal lines S that are adjacent in the first direction X. The switching element SW is arranged near a part where the scanning line G and the signal line S intersect.

The insulating film IL is formed in a grating pattern in each pixel PX. The insulating film IL overlaps with each of the scanning lines G, the signal lines S, and the switching element SW. The insulating film IL includes an aperture OP. In other words, the insulating film IL is formed in a bathtub shape.

The switching element SW comprises a drain electrode DE that extends into the aperture OP. The connection electrode CN1 is formed in an island shape and is located in the aperture OP. The connection electrode CN1 is electrically connected to one end of the drain electrode DE.

The power supply line CL is arranged on the insulating film IL and is formed in a grating pattern surrounding the pixel PX. The planar shape of the power supply line CL is substantially the same as the planar shape of the insulating film IL. The power supply line CL is separated from the connection electrode CN1.

The metal line ML is arranged on the power supply line CL and is formed in a grating pattern surrounding the pixel PX. For example, the metal line ML is formed to have a width smaller than that of the power supply line CL, and does not protrude from the power supply line CL in plan view. These power supply line CL and metal line ML overlap with each of the scanning line G, the signal line S, and the switching element SW.

Figure 4:
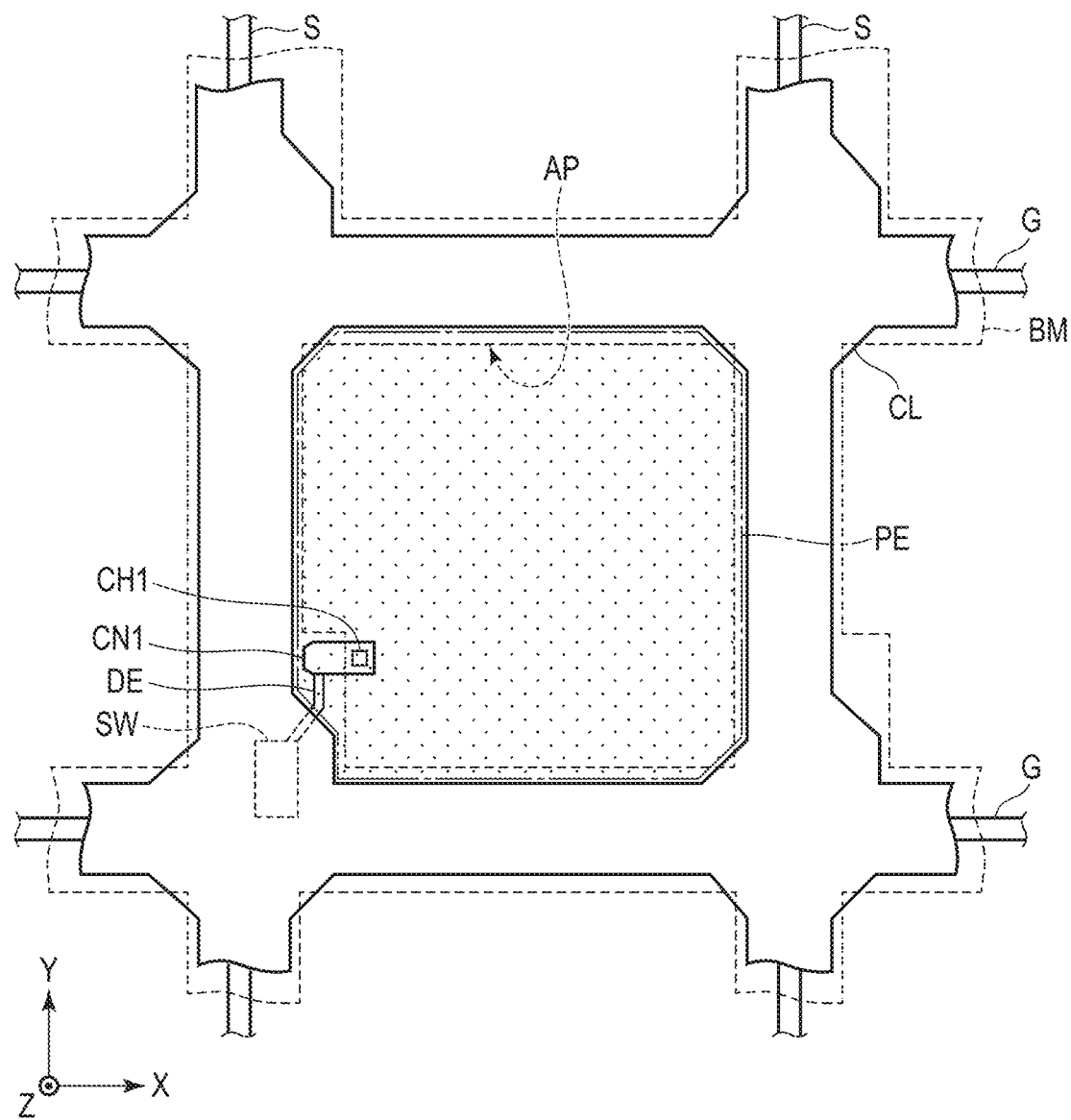
FIG. 4 is a schematic plan view showing an example of a pixel electrode arranged in the pixel shown in FIG. 3.

FIG. 4 is a schematic plan view showing an example of the pixel electrode PE arranged in the pixel PX shown in FIG. 3. The pixel electrode PE represented by a one-dot chain line overlaps with the aperture OP of the insulating film IL (shown in FIG. 3).

The pixel electrode PE overlaps with the connection electrode CN1 at the aperture OP. An insulating film is interposed between the pixel electrode PE and the connection electrode CN1. A contact hole CH1 is formed in the insulating film. The pixel electrode PE is in contact with the connection electrode CN1 in the contact hole CH1. The pixel electrode PE is thereby electrically connected to the switching element SW.

In FIG. 4, a light-shielding layer BM provided on the second substrate SUB2 is further represented by a dotted line. The light-shielding layer BM is formed in a grating pattern. The light-shielding layer BM overlaps with several parts of the power supply line CL, the switching element SW, the connection electrode CN1, and the like in plan view. The light-shielding layer BM also overlaps with the scanning lines G and signal lines S, and the metal lines ML shown in FIG. 3.

The light-shielding layer BM is formed to be larger than the scanning line G, the signal line S and the switching element SW in plan view. In other words, the scanning line G, the signal line S, and the switching element SW do not have portions that extend beyond the light-shielding layer BM in plan view. The light-shielding layer BM includes an aperture AP which overlaps with the pixel electrode PE in plan view.

Figure 5:
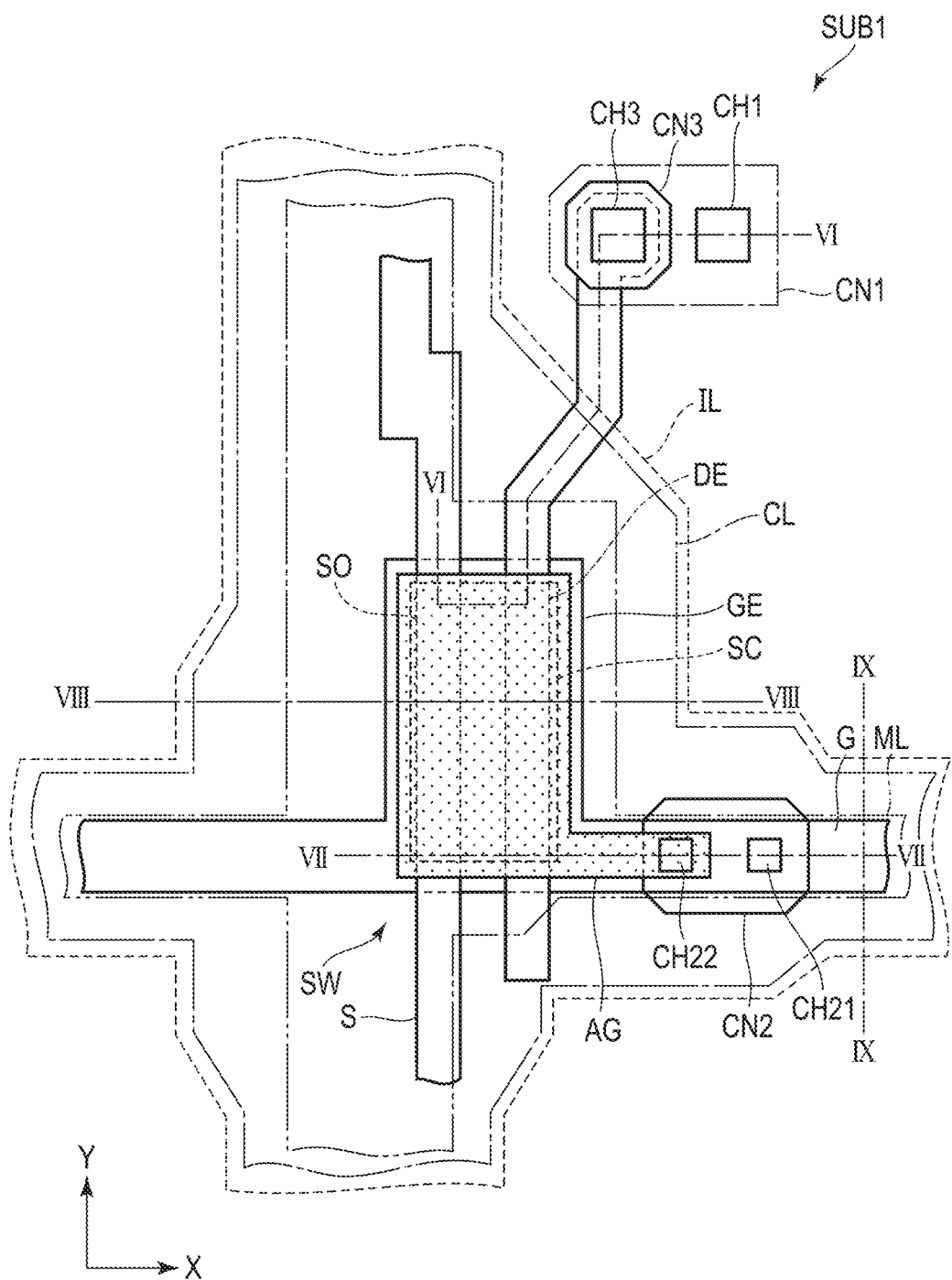
FIG. 5 is a schematic plan view showing an example of a first substrate including a switching element shown in FIG. 4.

FIG. 5 is a schematic plan view showing an example of a first substrate SUB1 including the switching element SW shown in FIG. 4. The switching element SW comprises a semiconductors SC, a gate electrode GE integrated with the scanning line G, a source electrode SO integrated with the signal line S, the drain electrode DE, and an auxiliary gate electrode AG.

The semiconductor SC is an oxide semiconductor. The semiconductor SC may be a silicon-based semiconductor of polycrystalline silicon, amorphous silicon or the like. In the example shown in FIG. 5, the auxiliary gate electrode AG overlaps with the gate electrode GE and the semiconductors SC. The semiconductors SC are located between the gate electrode GE and the auxiliary gate electrode AG. The auxiliary gate electrode AG further overlaps with the scanning line G. A connection electrode CN2 is interposed between the scanning line G and the auxiliary gate electrode AG.

An insulating film is interposed between the scanning line G and the connection electrode CN2. A contact hole CH21 is formed in the insulating film. The connection electrode CN2 is in contact with the scanning line G in the contact hole CH21.

An insulating film is interposed between the connection electrode CN2 and the auxiliary gate electrode AG. A contact hole CH22 is formed in the insulating film. The auxiliary gate electrode AG is in contact with the connection electrode CN2 in the contact hole CH22.

The auxiliary gate electrode AG is thereby electrically connected to the scanning line G, similarly to the gate electrode GE. In other words, the gate electrode GE and the auxiliary gate electrode AG have the same potential as the scanning line G.

Each of the source electrode SO and the drain electrode DE extends along the second direction Y, and the electrodes are arranged at intervals along the first direction X. The source electrode SO is in contact with one end side of the semiconductor SC. The drain electrode DE is in contact with the other end side of the semiconductor SC.

One end portion of the drain electrode DE overlaps with a connection electrode CN3. An insulating film is interposed between the drain electrode DE and the connection electrode CN3. A contact hole CH3 is formed in the insulating film.

The drain electrode DE is in contact with the connection electrode CN3 in the contact hole CH3.

The connecting electrode CN1 represented by a one-dot chain line is in contact with the connection electrode CN3. The connection electrode CN1 is thereby electrically connected to the switching element SW. The connection electrode CN1 is electrically connected to the pixel electrode PE shown in FIG. 4 in the contact hole CH1.

The power supply line CL represented by a one-dot chain line overlaps with the gate electrode GE and the auxiliary gate electrode AG of the switching element SW. The metal line ML represented by a two-dot chain line overlaps with the power supply line CL and also overlaps with a part of the switching element SW.

Figure 6:
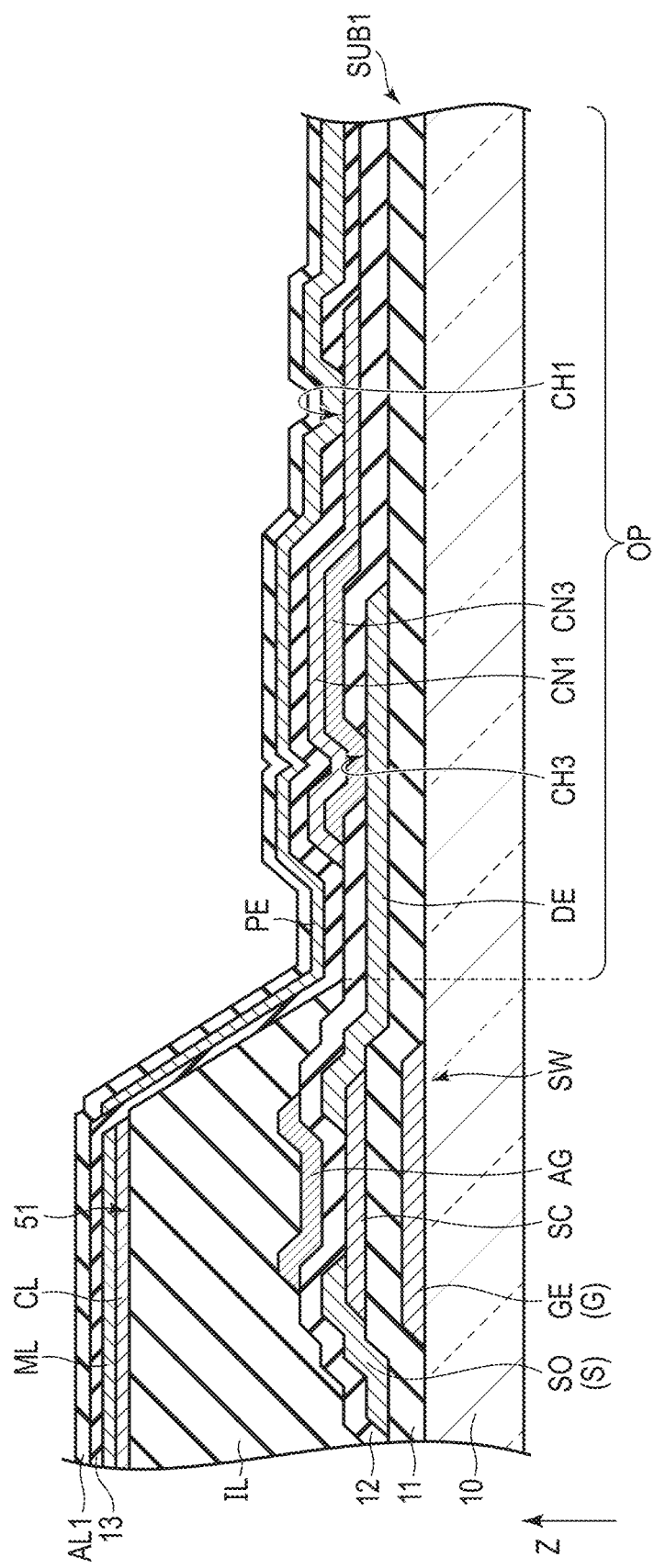
FIG. 6 is a schematic cross-sectional view showing an example of the first substrate along line VI-VI shown in FIG. 5.

FIG. 6 is a schematic cross-sectional view showing an example of the first substrate SUB1 along line VI-VI shown in FIG. 5. The first substrate SUB1 comprises the first transparent substrate 10, insulating films 11, 12, and 13, the insulating film IL, the switching element SW, the power supply line CL, the metal line ML, the pixel electrode PE, and the alignment film AL1 (first alignment film).

The gate electrode GE integrated with the scanning line G is arranged on the first transparent substrate 10. The insulating film 11 covers the first transparent substrate 10 and the gate electrode GE. The semiconductor SC is arranged on the insulating film 11 and is located directly above the gate electrode GE.

The source electrode SO integrated with the signal line S is arranged on the insulating film 11 and is in contact with the semiconductor SC. The drain electrode DE is arranged on the insulating film 11 and is in contact with the semiconductor SC.

For example, the source electrode SO and the drain electrode DE are formed of the same metal material. The insulating film 12 covers the insulating film 11, the source electrode SO, and the drain electrode DE. The insulating film 12 is in contact with the semiconductor SC at a position between the source electrode SO and the drain electrode DE.

The auxiliary gate electrode AG is arranged on the insulating film 12 and is located directly above the gate electrode GE and the semiconductor SC. The connection electrode CN3 is arranged on the insulating film 12. The connection electrode CN3 is in contact with the drain electrode DE through the contact hole CH3 formed in the insulating film 12.

For example, the auxiliary gate electrode AG and the connection electrode CN3 are formed of the same metal material. The insulating film IL covers the auxiliary gate electrode AG. The connection electrode CN3 is located in the aperture OP and is exposed from the insulating film IL.

The power supply line CL is arranged on the insulating film IL. The connection electrode CN1 is spaced apart from the power supply line CL. The connection electrode CN1 is arranged on the insulating film 12 at the aperture OP of the insulating film IL.

The power supply line CL and the connection electrode CN1 are located in substantially the same layer and are collectively formed of the same material. The connection electrode CN1 is arranged on the connection electrode CN3.

The metal line ML is arranged on the power supply line CL. The insulating film 13 covers the power supply line CL, the metal line ML, and the connection electrode CN1. The insulating film 13 comprises a function of a protective film protecting the power supply line CL, the metal line ML, and the connection electrode CN1.

The pixel electrode PE is arranged on the insulating film 13. The pixel electrode PE overlaps with the aperture AP.

The pixel electrode PE is in contact with the connection electrode CN1 through the contact hole CH1 formed in the insulating film 13.

The alignment film AL1 covers the pixel electrode PE and the insulating film 13. Part of the insulating film 13 is located between the insulating film IL and the alignment film AL1. From another viewpoint, the alignment film AL1 overlaps with the insulating film IL.

The insulating films 11, 12, and 13 are, for example, transparent inorganic insulating films of silicon oxide, silicon nitride, silicon oxynitride or the like. The insulating film IL is, for example, a transparent organic insulating film of an acrylic resin or the like. The power supply line CL, the connection electrode CN1, and the pixel electrode PE are transparent electrodes formed of a transparent conductive material such as indium tin oxide (ITO) or indium zinc oxide (IZO).

Figure 7:
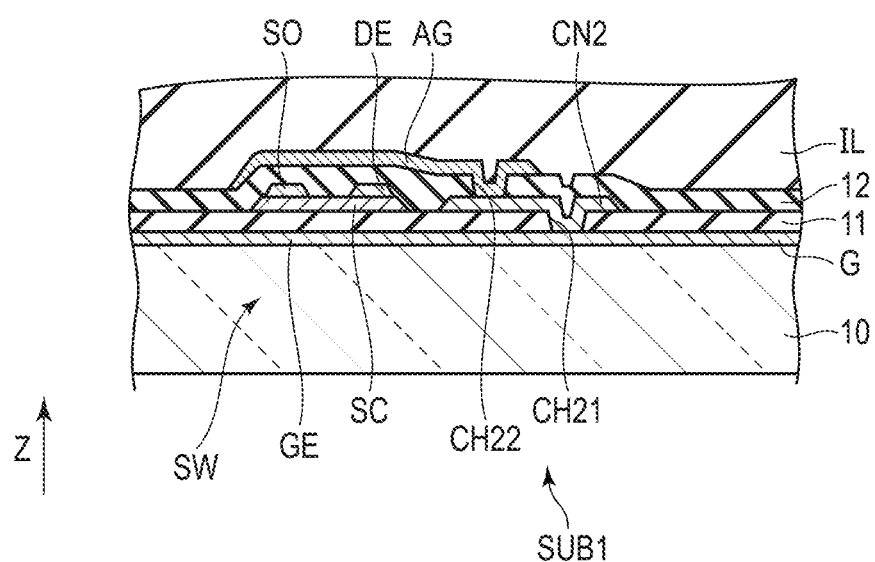
FIG. 7 is a schematic cross-sectional view showing an example of the first substrate along line VII-VII shown in FIG. 5.

FIG. 7 is a schematic cross-sectional view showing an example of the first substrate SUB1 along line VII-VII shown in FIG. 5. The connection electrode CN2 is arranged on the insulating film 11. The connection electrode CN2 is in contact with the scanning line G through the contact hole CH21 formed in the insulating film 11.

The connection electrode CN2 is formed of, for example, the same metal material as the source electrode SO and the drain electrode DE. The insulating film 12 covers the insulating film 11, the connection electrode CN2, the source electrode SO, and the drain electrode DE. The auxiliary gate electrode AG is in contact with the connection electrode CN2 through the contact hole CH22 formed in the insulating film 12.

Figure 8:
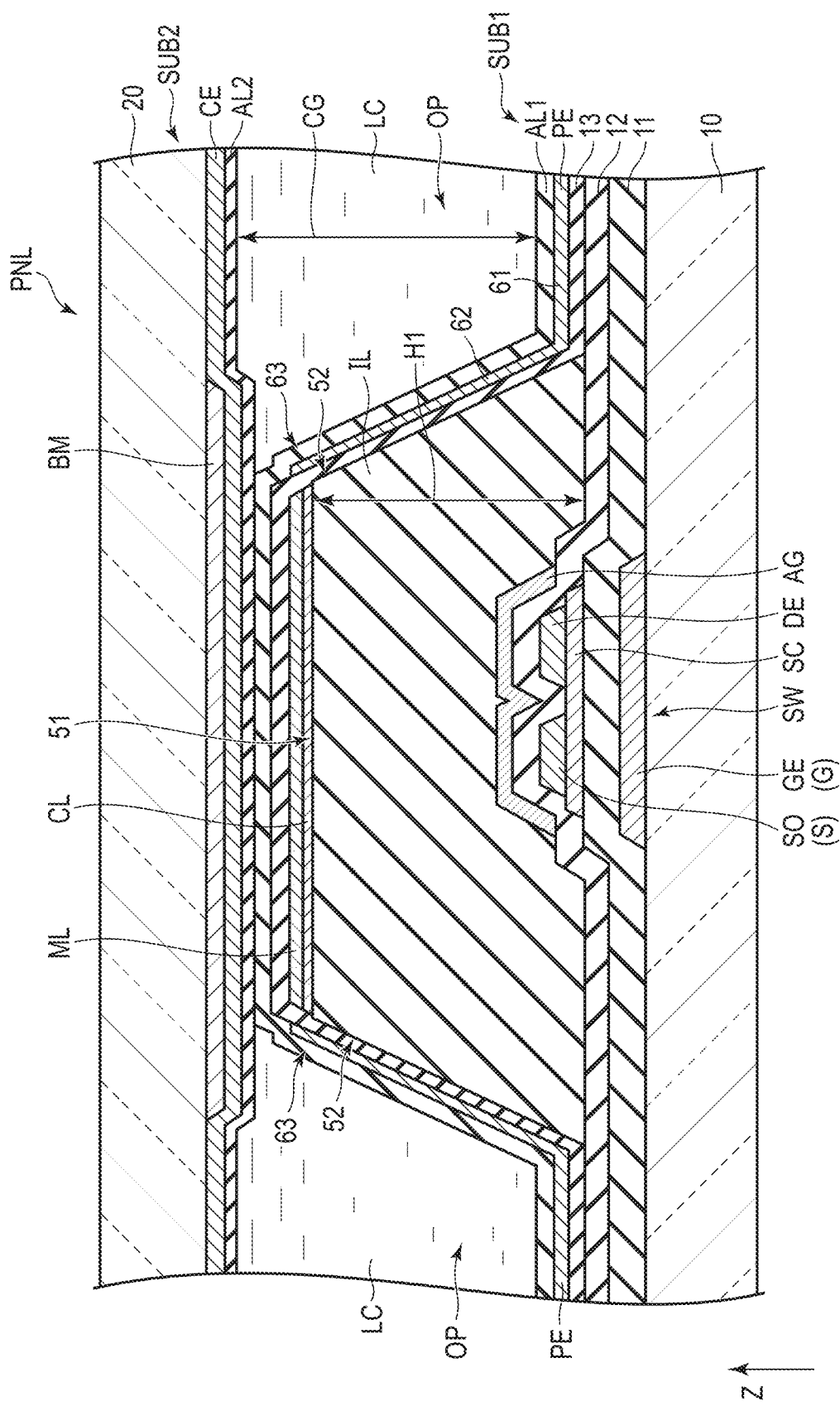
FIG. 8 is a schematic cross-sectional view showing an example of a display panel along line VII-VIII shown in FIG. 5.
Figure 9:
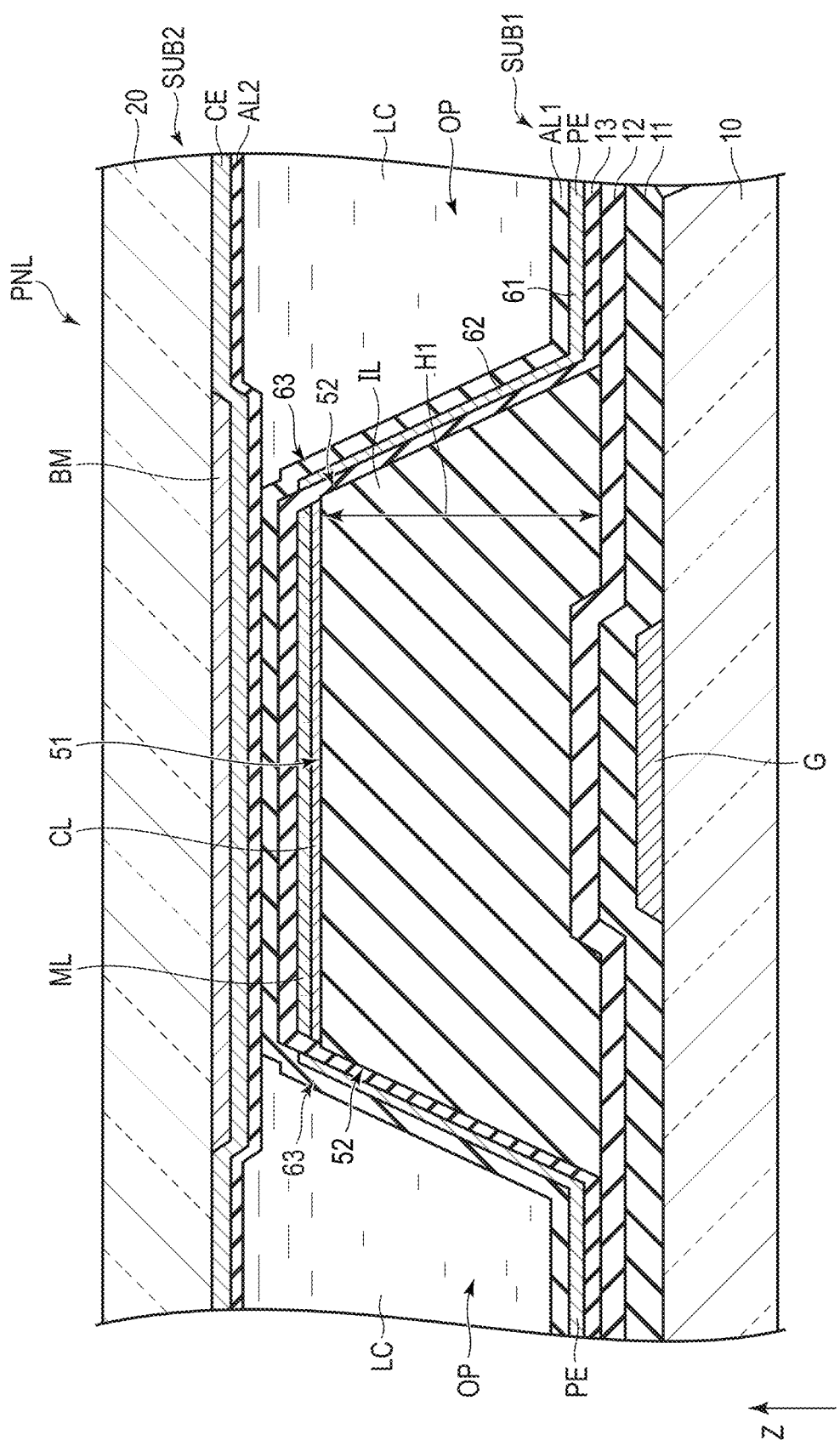
FIG. 9 is a schematic cross-sectional view showing an example of the display panel along line IX-IX shown in FIG. 5.

FIG. 8 is a schematic cross-sectional view showing an example of the display panel PNL along line VII-VIII shown in FIG. 5. FIG. 9 is a schematic cross-sectional view showing an example of the display panel PNL along line IX-IX shown in FIG. 5. The switching element SW is covered with an insulating film IL, which is an organic insulating film, as shown in FIG. 8. The insulating film IL overlaps with the scanning line G as shown in FIG. 9. FIG. 9 shows the cross-section along the second direction Y including the scanning line G, but the cross-section along the first direction X including the signal line S is configured in the same manner.

The second substrate SUB2 comprises the second transparent substrate 20, the light-shielding layer BM, the common electrode CE, and an alignment film AL2 (second alignment film) as shown in FIG. 8 and FIG. 9. The common electrode CE is a transparent electrode formed of a transparent conductive material such as indium tin oxide (ITO) or indium zinc oxide (IZO). The light-shielding layer BM is formed of, for example, a metal material.

In relation to the first substrate SUB1, the light-shielding layer BM faces the switching element SW, and the like. The light-shielding layer BM is located directly above the scanning line G and the signal line S, and directly above the switching element SW.

The light-shielding layer BM is located between the second transparent substrate 20 and the alignment film AL2. The common electrode CE is arranged across the plurality of pixels PX and covers the light-shielding layer BM. The common electrode CE is located between the light shielding layer BM and the alignment film AL2.

The common electrode CE faces the pixel electrode PE across the liquid crystal layer LC in the aperture OP. Since the common electrode CE is in contact with the light-shielding layer BM, the common electrode CE is electrically connected to the light-shielding layer BM. The common electrode CE is thereby made low-resistant.

The alignment film AL2 covers the common electrode CE. In relation to the second transparent substrate 20, the alignment film AL2 overlaps with the second transparent substrate 20. The liquid crystal layer LC is located between the first substrate SUB1 and the second substrate SUB2.

Each of the alignment films AL1 and AL2 is in contact with the liquid crystal layer LC as shown in FIG. 8 and FIG. 9. A transparent insulating film may be interposed between the light-shielding layer BM and the common electrode CE or between the common electrode CE and the alignment film AL2.

The insulating film IL has a bathtub shape as described above. As shown in FIG. 8 and FIG. 9, the insulating film IL has an upper surface 51 that faces the second substrate SUB2, and a plurality of side surfaces 52 connected to the upper surface 51.

The plurality of side surfaces 52 define the apertures OP. For example, the plurality of side surfaces 52 shown in FIG. 8 extend along the second direction Y, and the plurality of side surfaces 52 shown in FIG. 9 extend along the first direction X.

The insulating film 13 overlaps with the upper surface 51 and the side surfaces 52. More specifically, the insulating film 13 faces the upper surface 51 across the power supply line CL and the metal line ML and is in contact with the side surfaces 52.

The power supply line CL is located between the upper surface 51 and the insulating film 13. More specifically, the power supply line CL which is a transparent electrode is in contact with the upper surface 51 of the insulating film IL. The metal line ML is located between the power supply line CL and the insulating film 13 and is in contact with the insulating film 13. The metal line ML is electrically connected to the power supply line CL. Although not shown in the drawings, several parts of the power supply line CL are formed on the side surfaces 52, a pixel electrode PE (side portion 62 to be described below) and the power supply line CL overlap on the side surfaces 52, and the capacitance CS shown in FIG. 2 is thereby formed.

The pixel electrode PE is provided in the aperture OP and a part of the electrode is provided along the side surface 52. More specifically, the pixel electrode PE includes a main portion 61 and a side portion 62. The side portion 62 is formed integrally with the main portion 61. The main portion 61 is located in the aperture OP. The side portion 62 faces the side surface 52 across the insulating film 13.

The side portion 62 has a distal portion 63. The distal portion 63 is spaced apart from the alignment film AL2, as shown in FIG. 8 and FIG. 9. In other words, the distal portion 63 is not in contact with the alignment film AL2.

The distal portion 63 does not overlap with the power supply line CL in the third direction Z. For example, the distal portion 63 is located near the upper end of the side surface 52, but may be located near a lower end of the side surface 52 or located near a central part of the side surface 52.

At least a part of the portion of the alignment film AL1, which overlaps with the insulating film IL, is in contact with the alignment film AL2. Since the alignment film AL1 is thus in contact with the alignment film AL2, the formation of the gap where the liquid crystal layer LC is located above the upper surface 51 of the insulating film IL can be suppressed.

By forming the insulating film IL such that the alignment film AL1 is in contact with the alignment film AL2, a predetermined cell gap CG is formed between the first substrate SUB1 and the second substrate SUB2.

The cell gap CG corresponds to a distance along the third direction Z from the alignment film AL1 to the alignment film AL2 in the aperture OP. For example, the cell gap CG is in a range from approximately 1 µm to 4 µm.

A height H1 of the insulating film IL is substantially equal to the size of the cell gap. In one example, the height H1 is in a range from approximately 1 µm to 4 µm. In the insulating film IL, the height H1 is set according to the desired cell gap CG.

Figure 10:
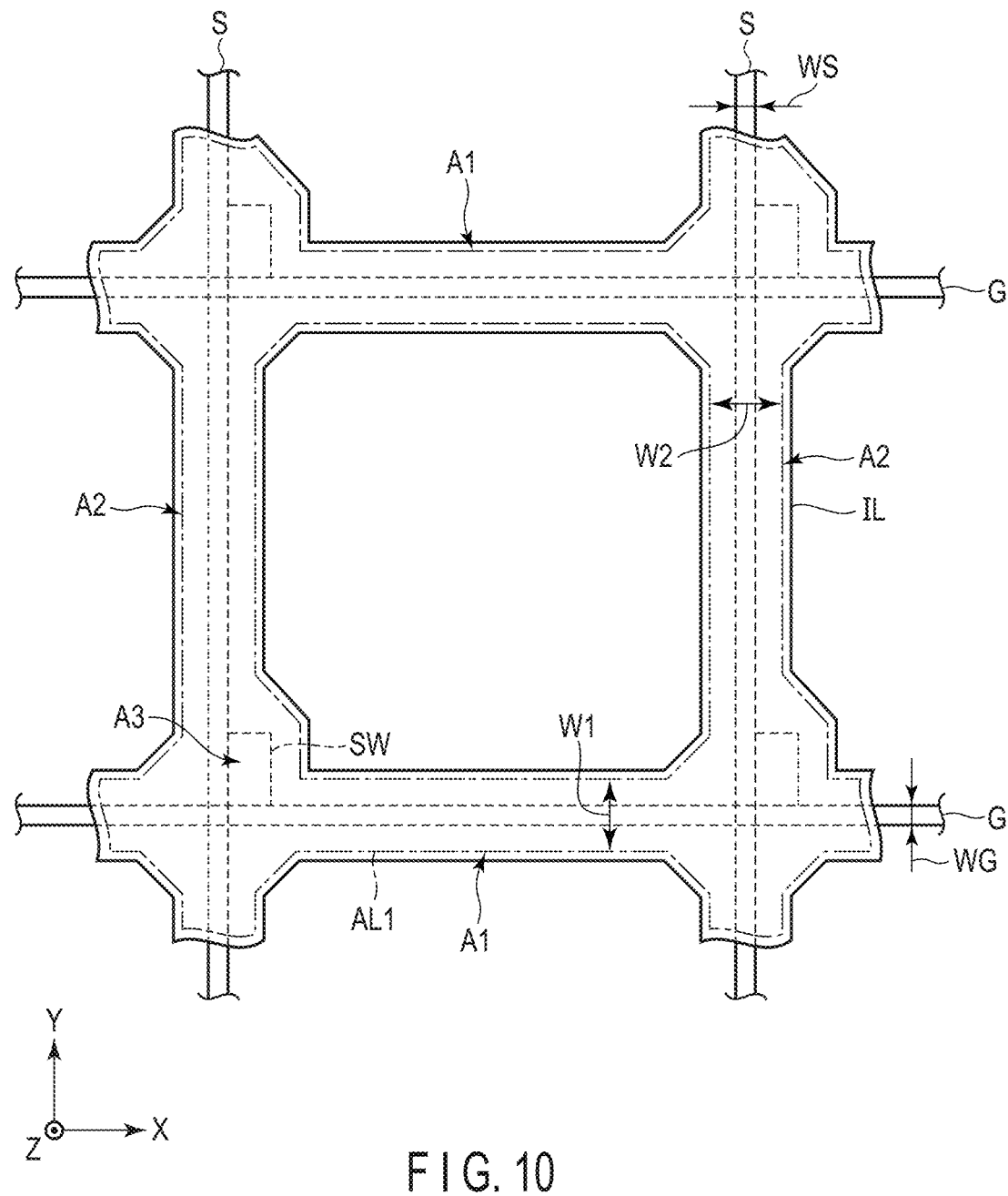
FIG. 10 is a schematic plan view showing an area where an alignment film of a first substrate is in contact with an alignment film of a second substrate.

FIG. 10 is a schematic plan view showing an area where the alignment film AL1 of the first substrate SUB1 is in contact with the alignment film AL2 of the second substrate SUB2. In FIG. 10, a portion of the alignment film AL1, which is in contact with the alignment film AL2, is represented by one-dot chain lines.

The alignment film AL1 includes a first area A1, a second area A2, and a third area A3 as shown in FIG. 10. The first area A1 includes an area overlapping with the scanning line G and extends along the first direction X. The second area A2 includes an area overlapping with the signal line S and extends along the second direction Y. The third area A3 is an area overlapping with the switching element SW.

For example, the alignment film AL1 is in contact with the alignment film AL2 in the first area A1, the second area A2, and the third area A3. In other words, the alignment film AL1 is in contact with the alignment film AL2 in a grating shape.

Incidentally, the alignment film AL1 may not be in contact with the alignment film AL2 in each of the first area A1, the second area A2, and the third area A3. The alignment film AL1 may be in contact with the alignment film AL2 in any one or two areas of the first area A1, the second area A2, and the third area A3.

A width W1 of the first area A1 along the second direction Y is, for example, larger than a width WG of the scanning lines G along the second direction Y. A width W2 of the second area A2 along the first direction X is, for example, larger than a width WS of the signal line S along the first direction X. For example, the widths W1 and W2 may be larger than the widths of the power supply line CL and the metal line ML. For example, the widths W1 and W2 may be smaller than the width of the light-shielding layer BM.

According to the display device DSP configured as described above, the display quality can be improved. More specifically, at least a part of the portion of the alignment film AL1, which overlaps with the insulating film IL, i.e., the organic insulating film, is in contact with the alignment film AL2 in the display device DSP. The formation of the gap where the liquid crystal layer LC is located above the upper surface 51 of the insulating film IL can be thereby suppressed.

Figure 12:
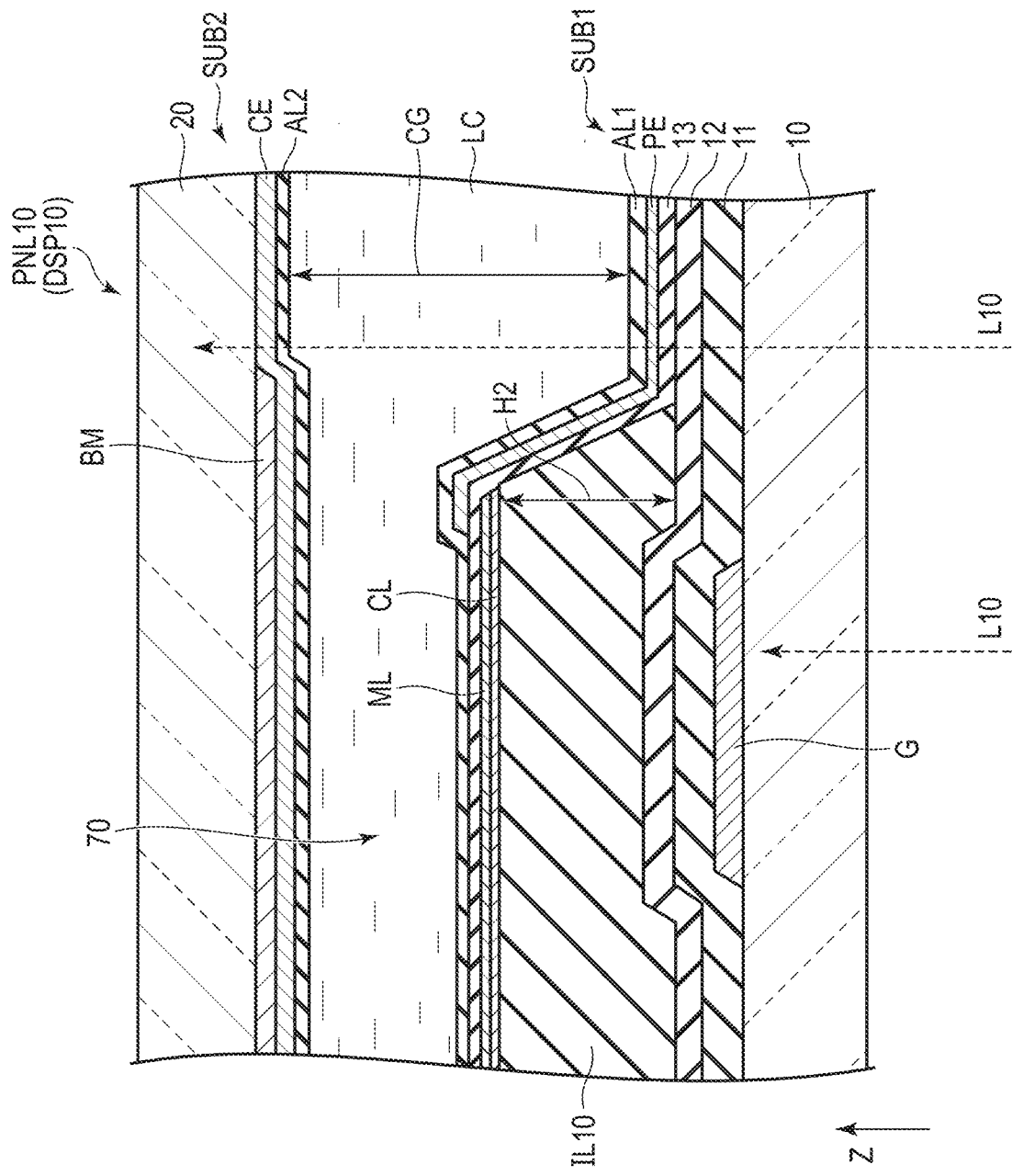
FIG. 12 is a schematic cross-sectional view showing an example of a display panel provided in the display device according to the comparative example.

FIG. 11 and FIG. 12 are schematic cross-sectional views showing an example of the display panel PNL 10 provided in the display device DSP 10 according to the comparative example. As shown in FIG. 11, the display panel PNL 10 has a spacer SP in the vicinity of the switching element SW.

An insulating film IL10 is an element corresponding to the insulating film IL in the present embodiment. The spacer SP is located between the insulating film IL10 and the light-shielding layer BM. The spacer SP is provided under the common electrode CE and is in contact with the alignment film AL1.

In the display panel PNL10, the cell gap CG is formed mainly by the spacer SP. The alignment film AL1 overlapping with the insulating film IL10 is not in contact with the alignment film AL2 as shown in FIG. 11 and FIG. 12.

The height H2 of the insulating film IL10 in the comparative example is smaller than the height H1 of the insulating film IL in the present embodiment. In other words, a gap 70 is formed above the insulating film IL10, as shown in each of FIG. 11 and FIG. 12.

A height H70 of the gap 70 is, for example, approximately 1.0 μm or more (in one example, approximately 1.0 μm to 1.5 μm). In the gap 70, the liquid crystal layer LC is located as shown in FIG. 11 and FIG. 12.

It is assumed that the polymer of the liquid crystal layer LC is formed by emitting light L10 (for example, UV) from below the first transparent substrate 10 in the process of manufacturing the display device DSP10. A material forming the liquid crystal layer LC (hereinafter referred to as "liquid crystal material") is located in the gap 70.

The gap 70 overlaps with the scanning line G and the signal line S formed of the metallic material, and the like, in the third direction Z. Therefore, the emitted light does not fully hit the liquid crystal material overlapping with the scanning line G, the signal line S, and the like. As a result, an abnormality may occur in the portion of the liquid crystal layer LC, which is located in the gap 70. The abnormality is, for example, alignment failure of the liquid crystal molecules.

This may cause the light emitted from the light emitting module 100 to be scattered unintentionally, in this portion. For example, as shown in FIG. 12, non-uniformity occurs when the light is scattered in the liquid crystal layer LC located in the gap 70. Such non-uniformity may degrade the display quality in the display device DSP10.

In the display device DSP according to the present embodiment, the formation of the gap is suppressed at the portion overlapping with the scanning line G, the signal line S, and the like. By suppressing the formation of the gap where the liquid crystal material is located, the liquid crystal material to which the emitted light is not applied can hardly be generated in the manufacturing process, and the occurrence of anomalies in the liquid crystal layer LC is suppressed. Accordingly, unintentional scattering of the light emitted from the light emitting module 100 in the portion can be suppressed, and the display quality can be improved.

In the present embodiment, the display panel PNL does not include a spacer SP (shown in FIG. 11) since the cell gap CG is formed mainly by the insulating film IL. For this reason, a process of forming the spacer SP does not need to be formed in the process of manufacturing the display device DSP. In the display device DSP, the manufacturing process can be simplified as compared to the display device DSP10 of the comparative example. Accordingly, costs for manufacturing the display device DSP, and the like can be suppressed.

In the present embodiment, the alignment film AL1 is in contact with the alignment film AL2 in the first area A1, the second area A2, and the third area A3. Accordingly, the formation of the gap is suppressed at the portion overlapping with the scanning line G, the signal line S, and the switching element SW, which is arranged between the alignment film AL1 and the alignment film AL2.

As a result, since unintentional scattering of the emitted light can be suppressed, the display quality can be further improved in the display device DSP. Incidentally, the liquid crystal material located in the aperture OP is arranged in each pixel PX by, for example, a drop method (ODF method) in the manufacturing process.

Since the widths W1 and W2 of the first area A1 and the second area A2 are larger than the widths WG and WS of the scanning line G and the signal line S, respectively, the formation of the gap at the portion overlapping with the scanning line G and the signal line S is suppressed. Accordingly, the light can be certainly applied to the liquid crystal material, and abnormalities hardly occur in the liquid crystal layer LC, in the manufacturing process.

As described above, according to the present embodiment, the display device DSP capable of improving the display quality can be provided.

Next, other embodiments will be described. In the other embodiments described below, the same components as those of the above-described first embodiment may be denoted by the same reference numerals as those in the first embodiment, and their detailed description may be omitted or simplified.

Second Embodiment

Figure 13:
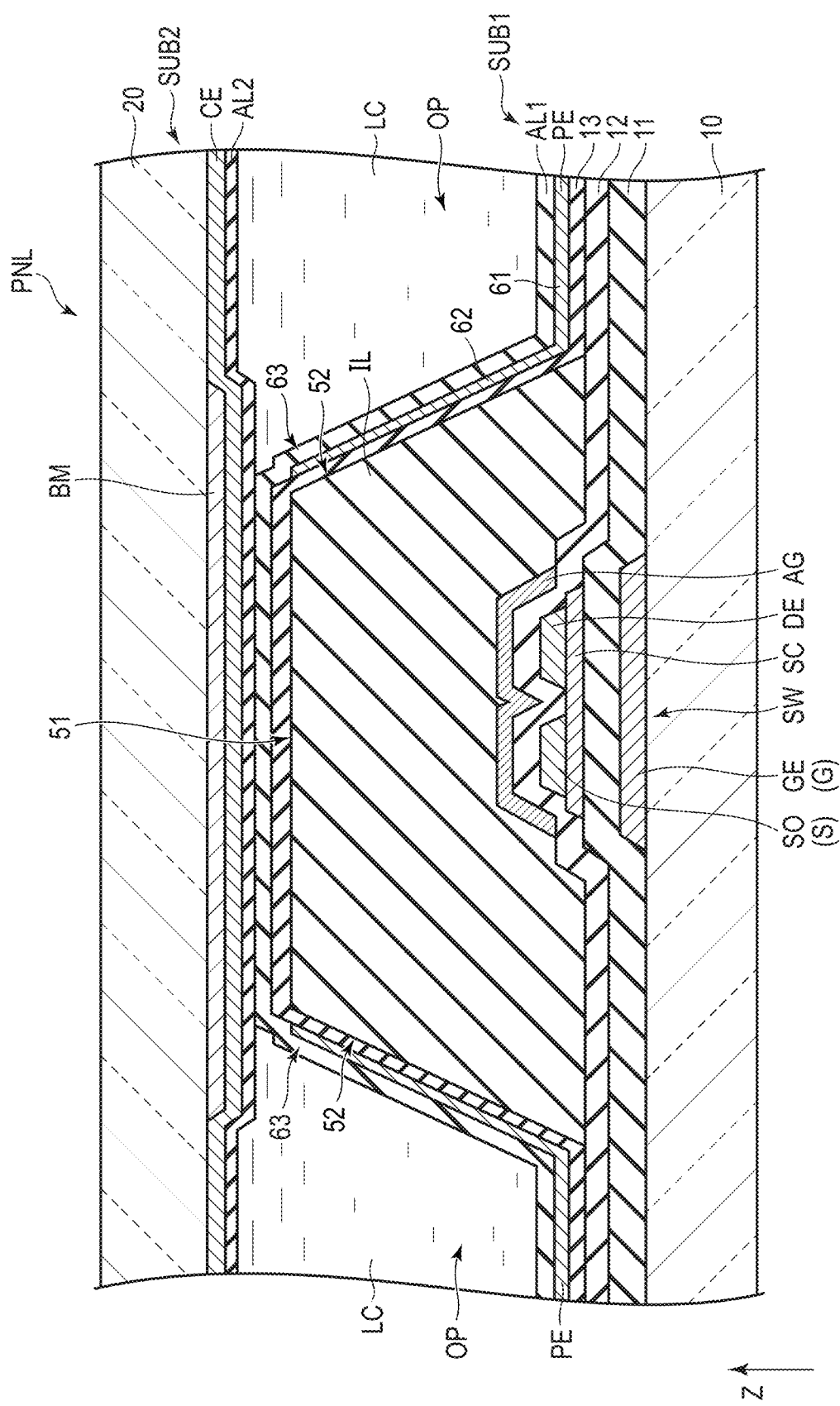
FIG. 13 is a schematic cross-sectional view showing a display panel according to the second embodiment.

FIG. 13 is a schematic cross-sectional view showing a display panel PNL according to the present embodiment. The present embodiment is different from the first embodiment in that the first substrate SUB1 does not comprise a power supply line CL or a metal line ML.

An upper surface 51 of an insulating film IL, an insulating film 13, and an alignment film AL1 are stacked in this order in the third direction. The upper surface 51 of the insulating film IL is in contact with the insulating film 13, as shown in FIG. 13. The same advantages as those of the first embodiment can also be obtained from the configuration of the present embodiment.

Third Embodiment

Figure 14:
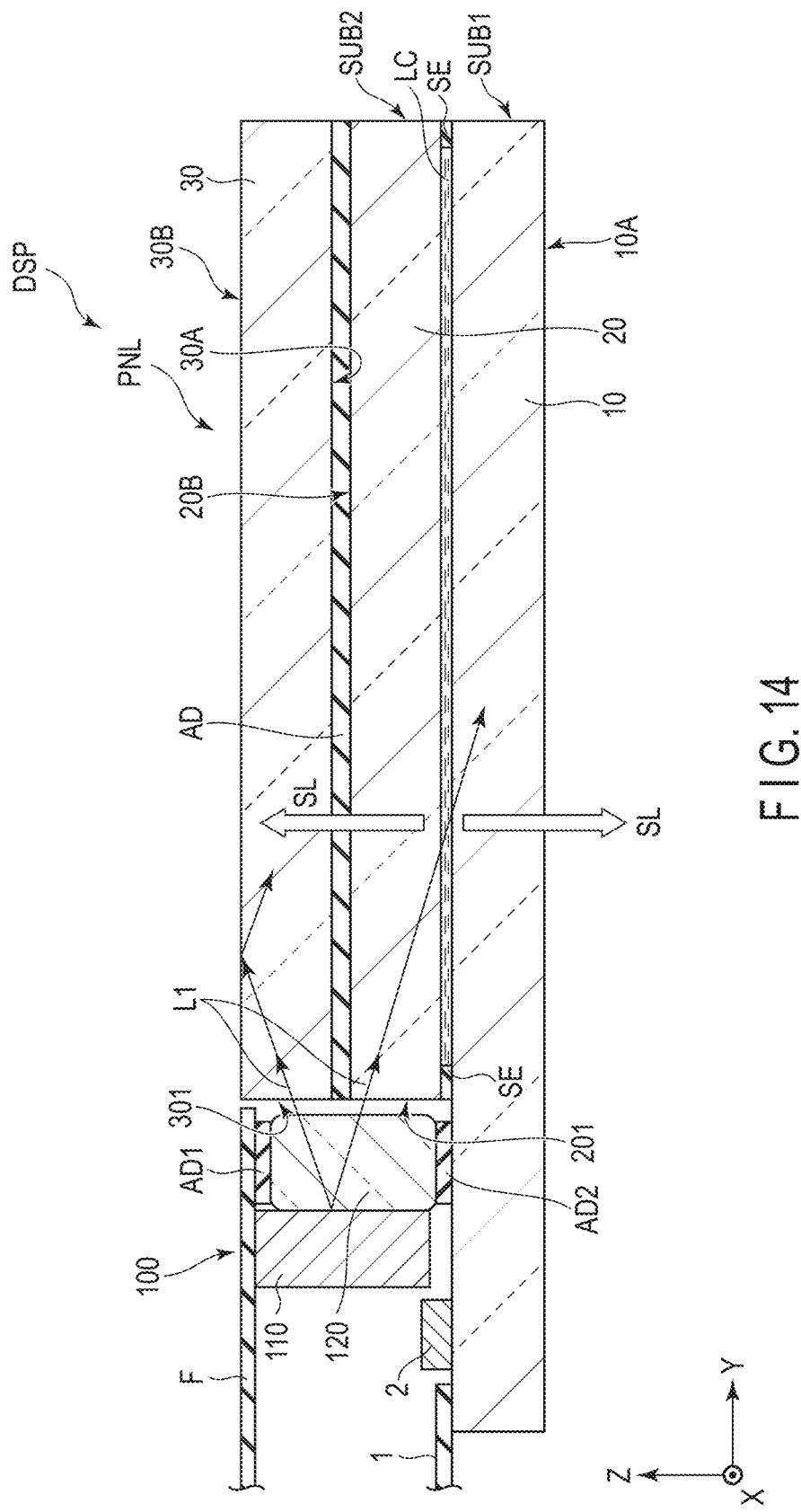
FIG. 14 is a schematic cross-sectional view showing a display device according to a third embodiment.

Next, another configuration example of the display device DSP will be described. FIG. 14 is a schematic cross-sectional view showing the display device DSP according to the present embodiment. The only main parts of the display panel PNL are simplified and illustrated.

The display panel PNL further comprises a third transparent substrate 30. A main surface 30A of the third transparent substrate 30 faces a main surface 20B of a second transparent substrate 20 in the third direction Z.

An adhesive layer AD bonds the second transparent substrate 20 and the third transparent substrate 30. The third transparent substrate 30 is, for example, a glass substrate, but may be an insulating substrate such as a plastic substrate. The third transparent substrate 30 has a refractive index equivalent to the refractive indexes of the first transparent substrate 10 and the second transparent substrate 20. The adhesive layer AD has a refractive index equivalent to the refractive index of each of the second transparent substrate 20 and the third transparent substrate 30.

A side surface 301 of the third transparent substrate 30 is located directly above the side surface 201 of the second transparent substrate 20. A light emitting element 110 of a light emitting module 100 is electrically connected to a wiring board F. The light emitting element 110 is provided between a first substrate SUB1 and the wiring board F in the third direction Z.

A light guide 120 is provided between the light emitting element 110 and the side surface 201 and between the light emitting element 110 and a side surface 301, in the second direction Y. The light guide 120 is adhered to the wiring board F by an adhesive layer AD1 and is adhered to the first substrate SUB1 by an adhesive layer AD2.

Next, light L1 emitted from the light emitting element 110 will be described.

The light emitting element 110 emits the light L1 toward the light guide 120. The light L1 emitted from the light emitting element 110 propagates along the second direction Y, passes through the light guide 120, and is made incident on the second transparent substrate 20 from the side surface 201, and also made incident on the third transparent substrate 30 from the side surface 301.

The light L1 made incident on the second transparent substrate 20 and the third transparent substrate 30 propagates through the inside of the display panel PNL while repeatedly reflected. The light L1 incident on the liquid crystal layer LC to which no voltage is applied is transmitted through the liquid crystal layer LC without being substantially scattered. In addition, the light L1 incident on the liquid crystal layer LC to which a voltage is applied is scattered by the liquid crystal layer LC. This scattered light SL is emitted from the display panel PNL and is visually recognized as a display image by the user.

The display device DSP can be observed not only from the side of the main surface 10A of the first substrate 10, but also from the side of the main surface 30B of the third transparent substrate 30. Even when the display device DSP is observed from the main surface 10A side or observed from the main surface 30B side, a background of the display device DSP can be observed via the display device DSP.

The display panel PNL of the first embodiment or the display panel PNL of the second embodiment can be applied to the display device DSP of the present embodiment.

All of display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, the above embodiments with addition, deletion, and/or designed change of their structural elements by a person having ordinary skill in the art, or the above embodiments with addition, omission, and/or condition change of their processes by a person having ordinary skill in the art are encompassed by the scope of the present inventions without departing the spirit of the inventions.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a first substrate;
a second substrate overlapping with the first substrate;
a liquid crystal layer located between the first substrate and the second substrate and containing polymer dispersed liquid crystal; and
a light emitting element, wherein
the first substrate comprises:
a first transparent substrate;
a scanning line;
a signal line intersecting the scanning line;
a switching element electrically connected to the scanning line and the signal line;
an organic insulating film including an aperture and overlapping with the scanning line, the signal line, and the switching element;
a pixel electrode overlapping with the aperture and electrically connected to the switching element; and
a first alignment film overlapping with the organic insulating film and being in contact with the liquid crystal layer,
the second substrate comprises:
a second transparent substrate; and
a second alignment film overlapping with the second transparent substrate and being in contact with the liquid crystal layer, and
at least a part of a portion of the first alignment film, which overlaps with the organic insulating film, is in contact with the second alignment film.

2. The display device of claim 1, wherein
the first substrate further comprises an inorganic insulating film located between the organic insulating film and the first alignment film,
the organic insulating film has an upper surface facing the second substrate, and a side surface connected to the upper surface to defined the aperture, and
the inorganic insulating film overlaps with the upper surface and the side surface.

3. The display device of claim 2, wherein
the inorganic insulating film is in contact with the upper surface.

4. The display device of claim 2, wherein
the first substrate further comprises a power supply line located between the upper surface and the inorganic insulating film, and a metal line located between the power supply line and the inorganic insulating film and electrically connected to the power supply line.

5. The display device of claim 4, wherein
the metal line has a width smaller than a width of the power supply line.

6. The display device of claim 2, wherein
the pixel electrode includes a side portion facing the side surface across the inorganic insulating film.

7. The display device of claim 6, wherein
the side portion includes a distal portion spaced apart from the second alignment film.

8. The display device of claim 4, wherein
the pixel electrode includes a side portion facing the side surface across the inorganic insulating film, and
the side portion includes a distal portion which is spaced apart from the second alignment film and which does not overlap with the power supply line.

9. The display device of claim 1, wherein
the second substrate further comprises a light-shielding layer which is located between the second transparent substrate and the second alignment film and which overlaps with the scanning line, the signal line, and the switching element.

10. The display device of claim 9, wherein
the second substrate further comprises a common electrode which is located between the light-shielding layer and the second alignment film and which is electrically connected to the light-shielding layer.

11. The display device of claim 1, wherein
the first alignment film is in contact with the second alignment film in any of a first area overlapping with the scanning line, a second area overlapping with the signal line, and a third area overlapping with the switching element.

12. The display device of claim 11, wherein
the first alignment film is in contact with the second alignment film in the first area, the second area, and the third area.

13. The display device of claim 11, wherein
a width of the first area is larger than a width of the scanning line, and
a width of the second area is larger than a width of the signal line.

14. The display device of claim 11, wherein
the first substrate further comprises an inorganic insulating film located between the organic insulating film and the first alignment film, a power supply line located between the organic insulating film and the inorganic insulating film, and a metal line located between the power supply line and the inorganic insulating film, and
widths of the first area and the second areas are larger than widths of the power supply line and the metal lines.

* * * * *